US00RE45209E

(19) United States
(12) Reissued Patent
Raman et al.

(10) Patent Number: US RE45,209 E
(45) Date of Reissued Patent: Oct. 28, 2014

(54) DISPLAY DEVICE COMPRISING AN ADJUSTABLE LIGHT SOURCE

(71) Applicant: Koninklijke Philips N.V., Eindhoven (NL)

(72) Inventors: Nalliah Raman, Eindhoven (NL); Gerben Johan Hekstra, Eindhoven (NL)

(73) Assignee: Koninklijke Philips N.V., Eindhoven (NL)

(21) Appl. No.: 14/080,212

(22) Filed: Nov. 14, 2013

Related U.S. Patent Documents

Reissue of:
(64) Patent No.: 8,059,082
Issued: Nov. 15, 2011
Appl. No.: 10/599,263
PCT Filed: Mar. 15, 2005
PCT No.: PCT/IB2005/050901
§ 371 (c)(1),
(2), (4) Date: Sep. 25, 2006
PCT Pub. No.: WO2005/093703
PCT Pub. Date: Oct. 6, 2005

(30) Foreign Application Priority Data

Mar. 26, 2004 (EP) ..... 04101258

(51) Int. Cl.
*G09G 3/36* (2006.01)

(52) U.S. Cl.
USPC ..... 345/102

(58) Field of Classification Search
USPC ..... 345/102
See application file for complete search history.

(56) References Cited

U.S. PATENT DOCUMENTS

| | | | | |
|---|---|---|---|---|
| 5,717,422 | A | 2/1998 | Fergason | |
| 6,631,995 | B2 | 10/2003 | Stanton et al. | |
| 2002/0021292 | A1* | 2/2002 | Sakashita | 345/204 |
| 2002/0027551 | A1* | 3/2002 | Nitta et al. | 345/204 |
| 2002/0130830 | A1* | 9/2002 | Park | 345/99 |
| 2003/0090889 | A1 | 5/2003 | Wacyk et al. | |
| 2003/0151565 | A1* | 8/2003 | Kim et al. | 345/60 |
| 2005/0017990 | A1* | 1/2005 | Yoshida | 345/690 |
| 2006/0071936 | A1* | 4/2006 | Leyvi et al. | 345/589 |

FOREIGN PATENT DOCUMENTS

| | | | |
|---|---|---|---|
| EP | 0513551 | A | 11/1992 |
| EP | 1111578 | A1 | 6/2001 |
| EP | 1367558 | A2 | 12/2003 |

OTHER PUBLICATIONS

ISR:PCT/IBOF/050901 Mar. 15, 2005.
ISR: PCT/IB05/050901, Mar. 15, 2005.
Written Opinion: PCT/IB05/050901 Mar. 15, 2005.

* cited by examiner

*Primary Examiner* — Jonathan Boyd

(57) ABSTRACT

The display device (DD) comprises an adjustable light source (BL), a display panel (DP) with display pixels for modulating light originating from the light source (BL) and processing circuitry (P) coupled to the display panel (DP) and the light source (BL). The processing circuitry (P) has an input for receiving an input signal (V1) representing gray levels of pixels of an image to be displayed on the display panel (DP). The processor (P) comprises:

selecting circuitry (S) for selecting a dimmed brightness level of the light source (BL) in dependence on the gray levels of the image pixels, and adaptation circuitry (A) for adapting the input signal (V1) in dependence on the dimmed brightness level.

40 Claims, 8 Drawing Sheets

DISPLAY DEVICE COMPRISING AN ADJUSTABLE LIGHT SOURCE

Matter enclosed in heavy brackets [ ] appears in the original patent but forms no part of this reissue specification; matter printed in italics indicates the additions made by reissue.

*This application claims the benefit or priority of and describes the relationships between the following applications: wherein this application is an application for reissue of U.S. Pat. No. 8,059,082, which issued Nov. 15, 2011, from U.S. patent application Ser. No. 10/599,263, filed Sep. 25, 2006, which is the National Stage of International Application No. PCT/IB2005/050901, filed Mar. 15, 2005, which claims the priority of foreign application EP 04101258 filed Mar. 26, 2004, each of which is incorporated herein by reference thereto.*

The invention relates to a display device comprising an adjustable light source, a display panel with display pixels for modulating light originating from the light source and processing circuitry coupled to the display panel and the adjustable light source.

EP 1,111,578A1 discloses a display device with a passive light modulation part and a light source. A video signal is provided to the passive light modulation part for generating an image. The amplitude of the video signal is dynamically adjustable based on a detected minimum, maximum and average brightness value of the video signal. The brightness of the light source is adjustable in such a way that the image displayed on the passive light modulation part after the dynamic adjusting of the amplitude does not vary visually from an average brightness level for each frame of the video signal. It is a disadvantage of the known display device that this adjustment of the amplitude and the corresponding adjustment of the brightness of the light source do not provide for all images the best possible rendering of these images on the light modulation part.

It is an object of the invention to provide a display device of the kind described in the opening paragraph, which has an alternative way of adjusting the amplitude of the video signal and the brightness of the light source.

The object is realized in that the display device comprises an adjustable light source; a display panel with display pixels for modulating light originating from the light source; and processing circuitry coupled to the display panel and the adjustable light source, the processing circuitry having an input for receiving an input signal representing gray levels of pixels of an image to be displayed on the display panel and comprising:

- means for selecting a dimmed brightness level of the light source in dependence on the gray levels of the image pixels, and
- means for adapting the input signal in dependence on the dimmed brightness level.

The invention is defined by the independent claims. The dependent claims define advantageous embodiments.

Firstly the dimmed brightness level of the light source is determined. This enables the selection of a value that the light source is able to provide, thereby taking into account, for example, operating conditions or limitations of dynamic variations of the light source. As a next step, the processing circuitry adapts the input signal taking into account the selected brightness level. This sequence enables the selection of a matching combination for each image of a dimmed brightness level and an adapted input signal. The prior art disclosed in EP 1,111,578A1 firstly determines the adaptation of the amplitude of the input signal and thereafter determines the dimmed brightness level so as to match a brightness level of the input signal. U.S. Pat. No. 5,717,422 discloses a display with a light source providing light to a light modulation part. A control is present for controlling the intensity of the light source as function of a brightness characteristic of an image to be displayed, while nothing is disclosed about adapting an input signal coupled to the modulation part in correspondence with the controlling of the intensity of the light source. U.S. Pat. No. 6,631,995 discloses a device with a light source and a light control device. Via a video signal amplifier a light modulation panel is driven in such a way that the contrast of an image to be displayed by the device has a desired value. Via a light-control device, controlling the amount of light provided by the light source to the modulation panel, the image to be displayed is corrected such that the brightness of the displayed image corresponds with a desired value. So, this prior art, firstly determines the desired contrast, and then to what extent to control the amount of light provided by the light source.

In an embodiment the means for selecting is adapted to select the dimmed brightness level in dependence on a number of occurrences of a gray level corresponding to a brightness of display pixels above the dimmed brightness level and/or a number of occurrences of a gray level corresponding to a brightness level of display pixels below a predetermined brightness level. Compared to the prior art disclosed in EP 1,111,578 A1, this invention provides generally a further dimming of the light source, resulting in an improved discernability of the dark gray levels corresponding to brightness levels near the minimum brightness level at the expense of some clipping of the gray levels corresponding to brightness levels near the dimmed brightness level. The predetermined level may be a fixed level, or, more preferably, an adjustable level, which is determined in dependence on the dimmed brightness level.

In an embodiment the predetermined brightness level is formed by the maximum contrast ratio of the display panel and the dimmed brightness level, preferably by dividing the dimmed brightness level by the contrast ratio. When selecting the dimmed brightness level it is important to take into account the resulting minimum brightness level that can be reproduced, as gray levels corresponding to a brightness level below this minimum obtainable brightness level are not correctly reproduced on the display device. When determining the predetermined brightness level, a suitable range of values is 50% to 150% of the ratio of the dimmed brightness level and contrast ratio, particularly a range of 80% to 100%.

These and other aspects of the invention will be further elucidated and described with reference to the drawings, in which.

The same references in different Figs. refer to the same signals or to elements performing the same function.

Figure 1:
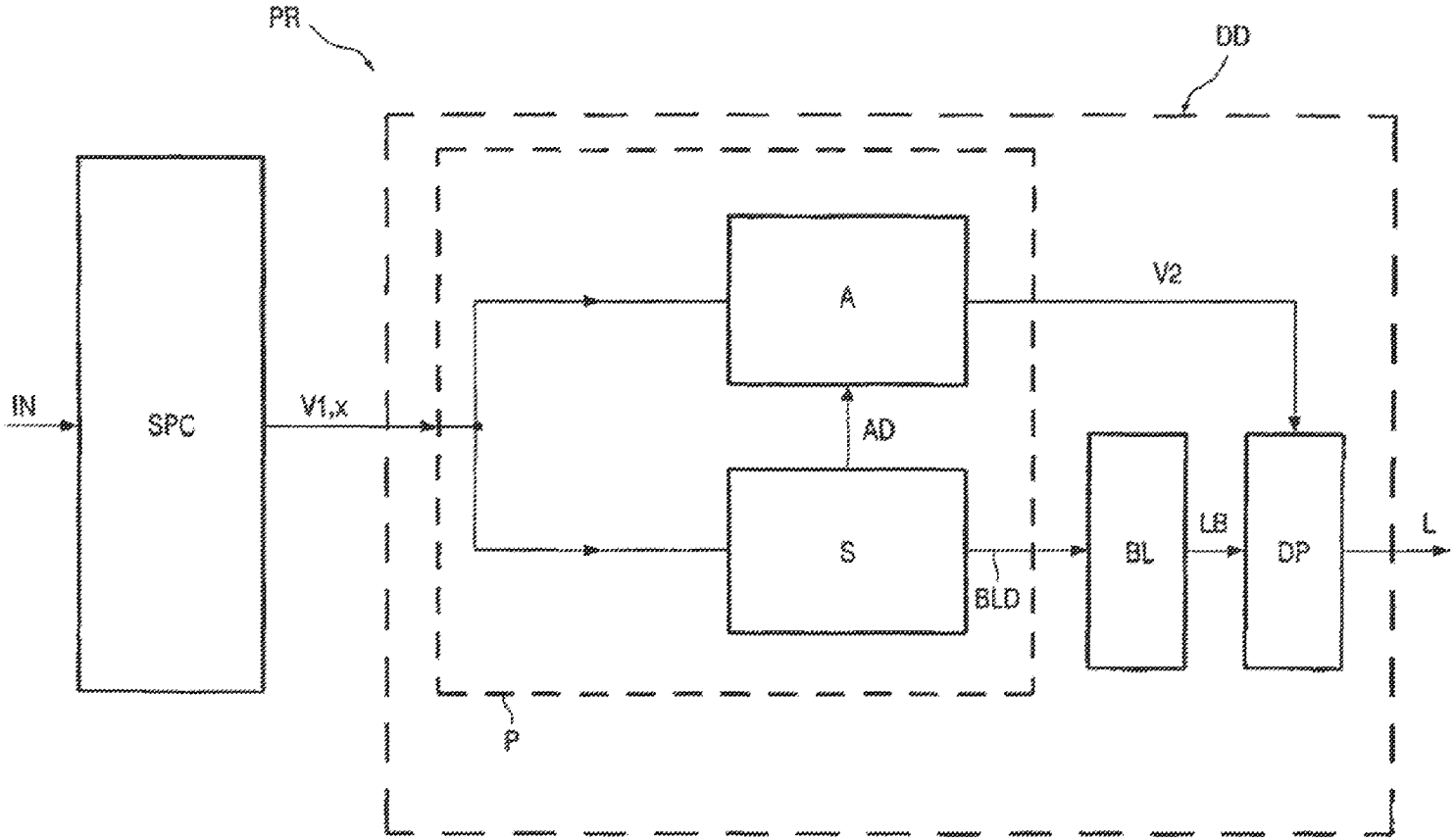
FIG. 1 shows a block diagram of an embodiment of the display device according to the invention.

An embodiment of the display device DD according to the invention as shown in FIG. 1 comprises an adjustable light source BL, a display panel DP with pixels for modulating light LB originating from the light source BL, and processing circuitry P. The processing circuitry P is coupled to the display panel DP and to the adjustable light source BL and has an input for receiving an input signal V1 representing an image to be displayed on the display panel DP. The image may be represented by a matrix of rows and columns of pixels. In case of a moving image (video), the input signal represents a sequence of images. In case the input signal comprises sequences of parts of images, for example, even and odd fields of a video frame, then the image is to be interpreted also as such an even or odd field.

The processing circuitry P comprises means for selecting a dimmed brightness level Lbdim of the light source BL in dependence on brightness levels, hereinafter also called gray levels, of pixels of the image to be displayed. The means for selecting may be hardware selection circuitry S as shown in FIG. 1 or may be realized with software or a combination of both. The means for selecting processes the input signal V1 and selects the dimmed brightness level Lbdim, thereby substantially minimizing an error function as will be explained later on. The selection circuitry S provides a light source drive signal BLD for adapting the brightness level LB of the light source BL to the dimmed brightness level Lbdim.

The processing circuitry P further comprises means for adapting the input signal V1 in dependence on the selected dimmed brightness level LBdim. The means for adapting may be hardware adaptation circuitry A as shown in FIG. 1 or may be realized with software or a combination of both. The selection circuitry S provides an adaptation drive signal AD to the adaptation circuitry A in dependence on the selected dimmed brightness level Lbdim. The adaptation circuitry A adapts the input signal V1, thereby talking into account the adaptation drive signal AD and any other transformations required to adapt the input signal V1 to an output signal V2, suitable for driving the display panel DP. These other transformations may include, amongst others, gamma correction, adaptation of the input signal V1 to transmission characteristics of the display panel DP, and/or adaptation of color components of the input signal V1 to the primary colors of the display panel DP. The output signal V2 driving the display panel DP, in combination with the brightness level of the light LB from the light source BL, determines the light output L of each of the pixels of the display panel.

The input signal V1 may be analog or digital; it may represent monochrome images or color images. In case of color images, the input signal may comprise a separate luminance signal in combination with color information or may comprise color components, for example in the form of an RGB signal with a red color component R, a green color component G and a blue color component B. In case of color images, the term "gray level" is to be interpreted as an amplitude level of a color component. These gray levels or amplitude levels may be discrete levels in case of a digital input signal. For example, in case of an [a] *8* bit digital signal $2^8$=256 gray levels or amplitude levels are possible.

Figure 2A:
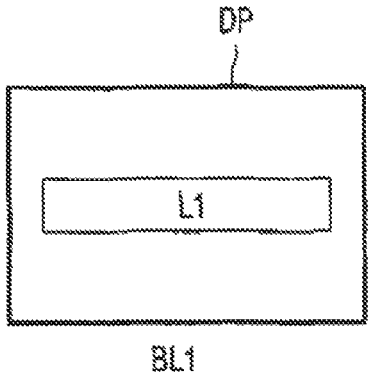
FIGS. 2A to 2C show various backlight configurations which may be applied in the display device according to the invention.
Figure 2B:
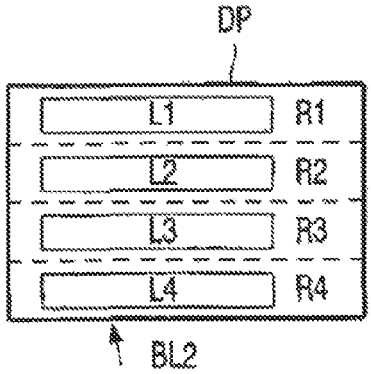

The light source BL may be a single lamp backlight unit BL1 with one lamp L1 as shown in FIG. 2A for illuminating the whole display panel DP. Alternatively, as shown in FIG. 2B, it may be a multiple lamp backlight unit BL2 with a plurality of lamps L1, L2, L3, L4, each directed to illuminate a corresponding region R1, R2, R3, R4 of the display panel DP. Each of the lamps L1, L2, L3, L4 may be dimmed simultaneously with a substantially same amount or may be dimmed separately with a different amount and/or at different moments in time. In case the regions R1, R2, R3, R4 partially overlap each other, the effect of dimming one of the lamps L1, L2, L3, L4 for a particular one of the regions R1, R2, R3, R4 may result in a change of brightness levels in another region which overlaps with this particular region. In such a case the change of brightness levels may be corrected by adapting the output signal V2, such that this adaptation counteracts the changes. If one or more of the regions R1, R2, R3, R4 correspond, for example, to a horizontal (or vertical) black bar in an image to be displayed, the corresponding lamp L1; L2; L3; L4 may be turned off completely.

Figure 2C:
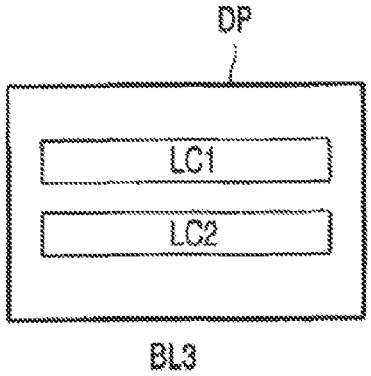

Another alternative, as shown in FIG. 2C, is a multicolor backlight unit BL3 with a plurality of color lamps LC1, LC2 of different color, the color lamps LC1, LC2 directed to illuminate a same region of the display panel DP. Of course, the light source may also be formed by alterations (for example of number, type or positions of lamps) and/or combinations of above mentioned backlight units. The number of lamps may be equal to the number of pixels.

Yet another alternative (not shown) is a backlight unit, having one or more lamps providing a substantially constant brightness, while dimming of the light is obtained by means of a light shutter, which controls the amount of light to be passed on from the lamps to the display panel DP. The light shutter may comprise parts which are controllable separately, so that the amount of light can be controlled per part of the area to be illuminated.

The lamps may be any type of lamp, like fluorescent lamps, LEDs, or OLEDs.

The display panel DP as shown in FIG. 1 may be a Liquid Crystal Display panel (LCD panel) or any other light-modulating panel, for example a panel with movable micro mirrors as used in a projector with Digital mirror Devices. The LCD panel may be a transmissive LCD panel for modulating the light passing through the panel as shown in FIG. 1 or a reflective LCD that modulates the light reflected by the panel (not shown) or a transflective LCD which is capable of modulating; both the transmitted and the reflected light.

The display panel DP may be applied in a display product PR, for example, a television set, a monitor, a portable computer (laptop), a PDA or mobile phone equipped with a display. In general, these products include signal processing circuitry SPC for processing signals received via an input terminal IN to [convext] *convert* them into the input signal V1 of the display module. The input terminal IN may be an antenna terminal or a connector via which a base band signal is received. The product PR may be a direct view display panel allowing a user to watch images on the display or a projection based system allowing the user to watch images projected from the display panel via an optical system on a screen. The projection system may be a rear or a front projection system.

Figure 3:
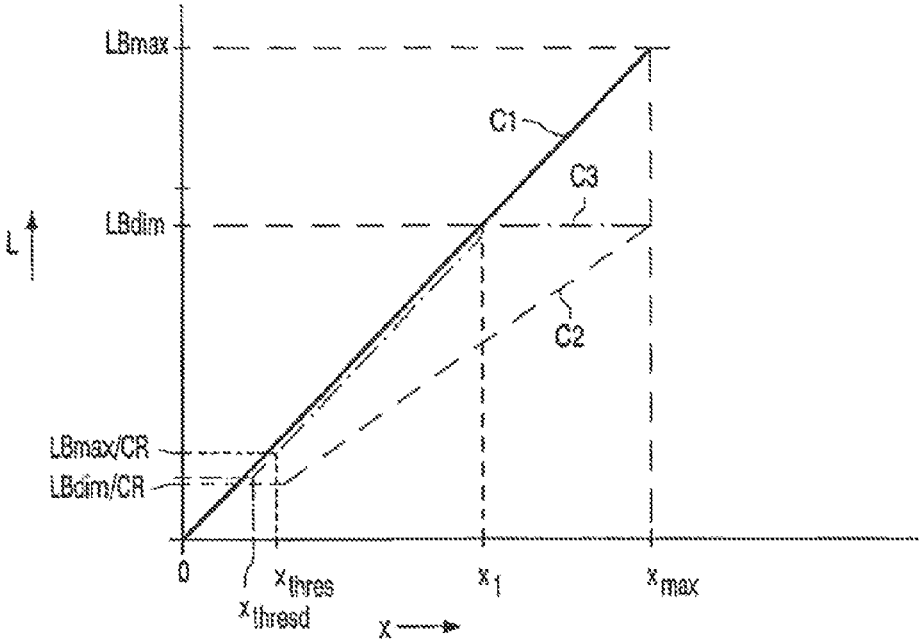
FIG. 3 shows a graph of the output luminance of the display panel versus the gray levels of the input signal of the display device illustrating the operation of an embodiment of the display device according to the invention.

For simplicity of the explanation, the principles of operation of the display device DD shown in FIG. 1, will be explained with reference to FIG. 3 illustrating an embodiment with a digital monochrome input signal V1, representing gray levels x of the pixel of the image.

When setting the light source BL to a maximum brightness level LBmax, the adaptation circuitry A may be designed to deliver an output signal V2, which results in a light output L of a display pixel as function of the gray level x of that corresponding pixel in the input signal according to the first curve C1. In case of an ideal panel the light output L would be proportional to the gray level x from a zero gray level (black level) to a maximum available gray level $x_{max}$ (white level). However, in practice the contrast ratio CR of a display panel, such as an LCD panel, is limited to a value in the order of magnitude of 100 to 200. As a result, the lowest brightness that can be represented is Lbmax/CR. This means that gray levels with a value below a threshold level $x_{thres}$ are not correctly displayed on the display panel DP: all dark gray values from 0 to $x_{thres}$ will have the light output Lbmax/CR.

For some images it may be advantageous to dim the light of the light source BL to a dimmed brightness level Lbdim to improve the reproduction of these dark gray values. This is illustrated by the second curve C2. As a result of the dimming, the lowest possible brightness is now reduced to a minimum brightness level Lbdim/CR as shown in FIG. 3.

By mapping the input signal V1 to the light output L according the third curve C3 a further improvement of the reproduction of dark gray levels is obtained up to a minimum gray level, being the dimmed threshold level $X_{thresd}$ which is smaller than $x_{thres}$. This dimmed threshold level $x_{thresd}$ corresponds to the minimum brightness level Lbdim/CR. This improvement is obtained at the expense of clipping of gray levels above a level $x_1$ corresponding to the dimmed brightness level Lbdim.

The input signal V1 may include a gamma pre-correction function Gs(Ls) which is provided by a source from which the image is obtained. The term Ls represents the brightness of the image at the source. The resulting gray level x of the input signal V1 may be expressed as:

$$x=Gs(Ls).$$

The display panel DP may have a gamma characteristic Gd that is different from the pre-correction function Gs. When driven by an adapted gray level x' the display panel DP generates a light output L of:

$$L=(Lbdim/Lbmax)\cdot Gd(x').$$

In order to match the light output L to the brightness Ls of the image source the adapted gray level x' should be:

$$x'=Gdi(Lbmax/Lbdim\cdot Ls)=Gdi(Lbmax/Lbdim\cdot Gsi(x)),$$

with Gdi and Gsi representing the inverse functions of Gd and Gs, respectively. [a] *A* look-up table may be applied to determine the adapted gray level x' as function of the gray level x.

Depending on the content of an image, the light BL may be dimmed. If the image contains many bright pixels with gray values close to $x_{max}$ and no values below $x_{thres}$, then the light source BL may be driven to its maximum value Lbmax. When an image contains very few pixels with a gray level above $x_1$ and many pixels with a gray level below $x_{thres}$, then the light source BL is preferably driven to the dimmed brightness level Lbdim. The dimmed brightness level Lbdim and the corresponding gray level $x_1$ may be determined dynamically for subsequent images (or per region of each of the subsequent images in case a multiple lamp backlight unit BL2 is applied). If an image contains both pixels with gray levels above $x_1$ and below $x_{thres}$, deterioration of the displayed image is inevitable and a compromise is necessary. In order to quantify the perceived deterioration of the displayed image, an error function is applied which corresponds to the amount of deterioration of the displayed image. By selecting for each image a dimmed brightness level Lbdim which results in a minimum value of this error function, the deterioration is minimized.

The error function includes a number of occurrences of gray levels x corresponding to a brightness level L above the dimmed brightness level Lbdim and/or a number of occurrences of gray levels x corresponding to a brightness level L below a predetermined brightness level, which preferably corresponds to the minimum brightness level Lbdim/CR. An embodiment of the error function $E_{Tot}(x_1)$ is given by the formula:

$$E_{Tot}(x_1)=\sum_{x=0}^{x_{thresd}} g(x)p(x)+\sum_{x=x_1+1}^{x_{max}} f(x)p(x),$$

wherein g(x) and f(x) are weighting functions, p(x) is the number of occurrences of a pixel with the gray level x divided by the total number of pixels in the image. $E_{tot}(x_1)$ is the error as a result of selecting the dimmed brightness level Lbdim corresponding to a gray level $x_1$.

Dividing by the total number of pixels may be omitted, as this number is the same for all terms in the summation and results merely in the resulting error function to be scaled with the number of pixels.

The weighting functions f(x), g(x) may be substantially equal to one, giving an equal weight to each of the gray levels above $x_1$ or below $x_{thresd}$.

Alternatively, the weighting functions may take into account information about pixels surrounding pixels with a same gray level x as explained in further detail below.

Figure 7:
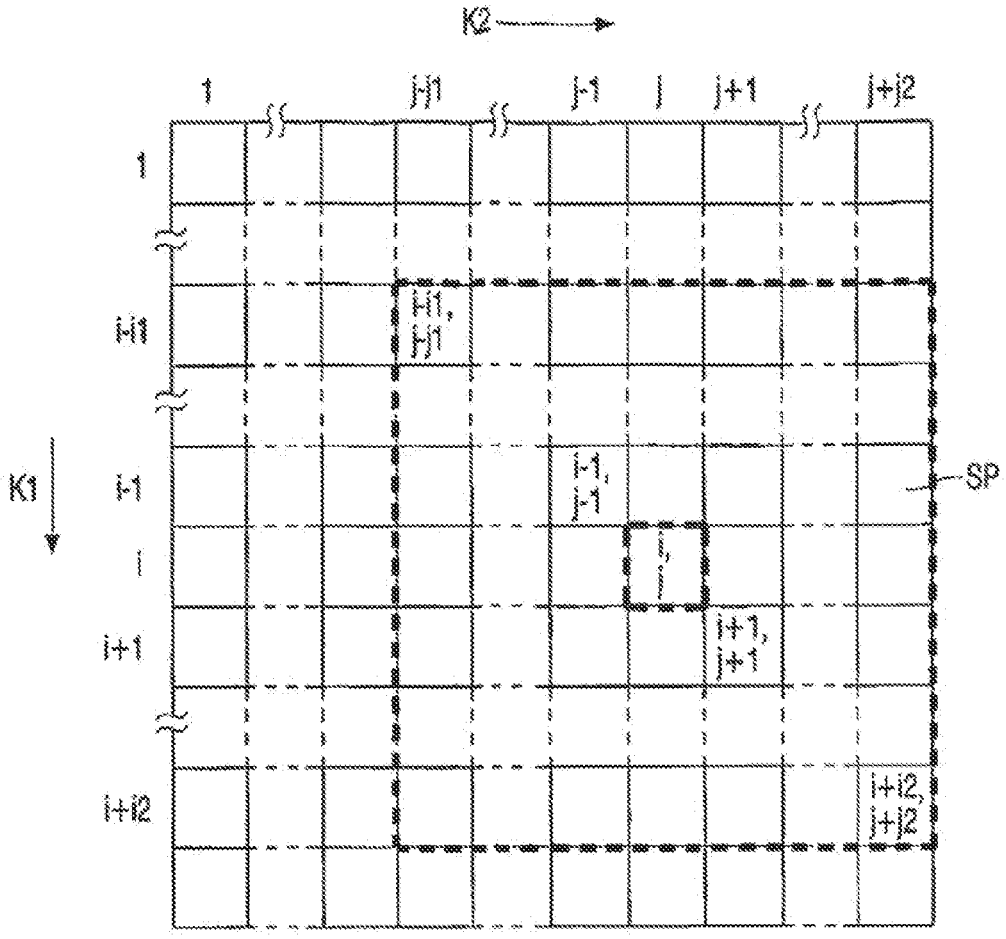
FIG. 7 shows a part of an image comprising a matrix of rows i and columns j of pixels.

FIG. 7 shows a part of an image comprising a matrix of rows i and columns j of pixels. Each pixel is identified by a combination of a row index i and a column index j. For a given gray level x above the gray level $x_1$ (so, being a gray level which is clipped), the indices i, j are determined for pixels having this gray level x. Then for each of the pixels with the thus determined indices i, j, the weight factor $f_{ij}$ is determined. This weight factor $f_{ij}$ is determined taking into account the gray level of pixels surrounding the pixel with indices i, j. The row indices i of the surrounding pixels range SP from a lowest value of i minus an integer value i1 up to and including a highest value of i plus an integer value i2. The column indices j of the surrounding pixels range from a lowest value of j minus an integer value j1 up to and including a highest value of j plus an integer value j2. The pixel with indices i, j is of course to be excluded from the surrounding pixels SP. A suitable method to determine this weight factor $f_{ij}$ is to sum differences d(k1,k2) in gray levels between the surrounding pixels SP with indices k1, k2 and the pixel with indices i, j. Only the surrounding pixels SP with a gray value larger than the gray level x of the pixel with indices i, j are taken into account, as this is an indication of the amount of clipping and of the amount of detail lost due to this clipping. So, the weight factor may be expressed as:

$$f_{ij}(x)=\sum_{k1=i-i1}^{i+i2}\sum_{k2=j-j1}^{j+j2}(d(k1,k2))^b,$$

where b is an exponent with b>=1 or b=0, d(k1,k2)=0 if d(k1,k2)<0, and the summation should exclude the combination k1=i with k2=j.

The value $f_{ij}$ is calculated for each of the pixels having the gray value x.

The final weight function f(x) associated with the gray level x, may be the largest value $f_{ij}$ found for the pixels with this value of x. Alternatively, f(x) may be the sum of all weight factors $f_{ij}$ found for the pixels with this value of x.

In another embodiment the weighting function f(x) is dependent on the amount of clipping as shown in below formula:

$$f(x)=(x-x_1)^b \text{ for } x>x_1 \text{ and } b=0 \text{ or } b\geq 1.$$

The term $(x-x_1)$ represents the deviations of the displayed gray value from the gray value x of the input signal, hence is a measure for the amount of clipping. The weighting may be linear by selecting b=1 or non-linear by selecting b>1. All embodiments provided for the weighting function f(x) apply mutatis mutandis for the weighting function g(x).

Figure 4:
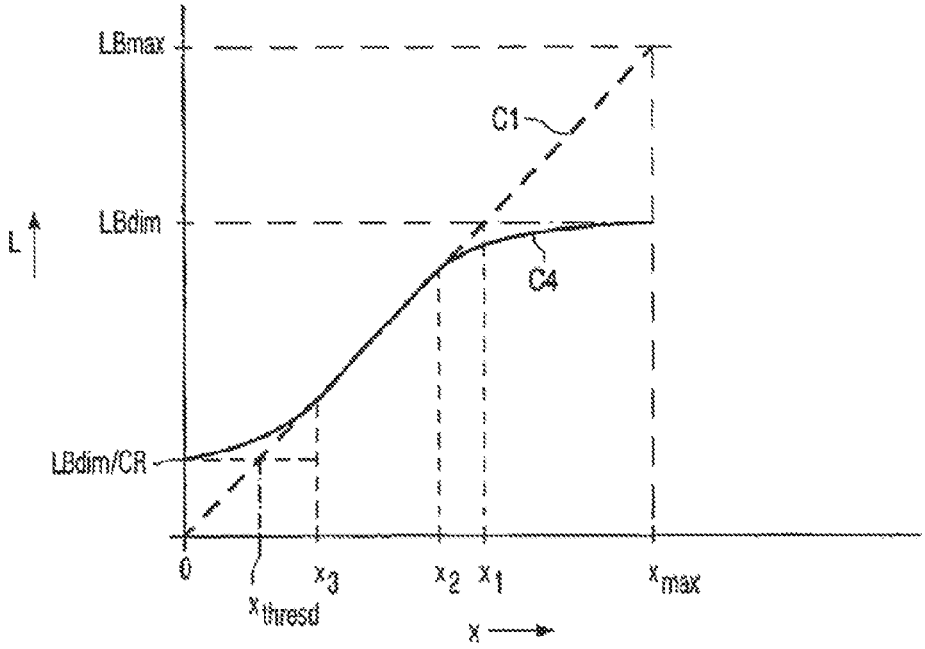
FIG. 4 shows another graph of the output luminance of the display panel versus the gray levels of the input signal of the display device illustrating the operation of another embodiment of the display device according to the invention.

Another embodiment with soft clipping is illustrated in FIG. 4. Like in FIG. 3, the light output L as function of the gray level x is shown with $x_{max}$ being the maximum gray level. The first curve C1 shows again the curve for an ideal panel. A fourth curve C4 illustrates the soft clipping for a dimmed brightness level Lbdim. Between gray levels $x_3$ and $x_2$ the fourth curve C4 follows substantially the first curve C1, similar to the third curve C3 as shown in FIG. 3. However the difference with the third-curve C3 is that below the gray level $x_3$ the relation of the light output L versus the gray level x is gradually flattened. When the gray level x approaches zero, the light output approaches the minimum brightness level Lbdim/CR. In the third curve C3 shown in FIG. 3, all gray levels between zero and $x_{thresd}$ are rendered with the same minimum brightness level Lbdim/CR. In the fourth curve C4 with soft clipping as shown in FIG. 4, the gray levels between zero and $x_{thresd}$ are rendered with a different brightness level. So, the gray levels below $x_{thresd}$ remain discernable, thereby improving the perceived image quality. Similarly, the fourth curve [C2] *C4* is flattened above $x_2$ in order to allow gray levels above $x_1$ to be discernable. This flattening may be non-linear as shown, but may also be linear from zero to $x_3$ and/or from $x_2$ to $x_{max}$ to simplify the required processing.

The embodiments illustrated in FIGS. 3 and 4 may have look-up tables. These look-up tables comprise for each gray level of the input signal V1 a corresponding value of the gray level of the output signal V2. When the display panel DP is driven with these corresponding gray values of the output signal V2, the light output L follows a curve as function of the gray level x as programmed in the look-up table.

Whether soft clipping is applied or not, may be made dependent on the amount of errors introduced in the light output L as function of the gray levels of the input signal V1. These errors result from clipping of the gray levels in the range from zero to $x_{thresd}$ and from $x_1$ to $x_{max}$ as, for example, is illustrated with the third curve C3 in FIG. 3.

Figure 8:
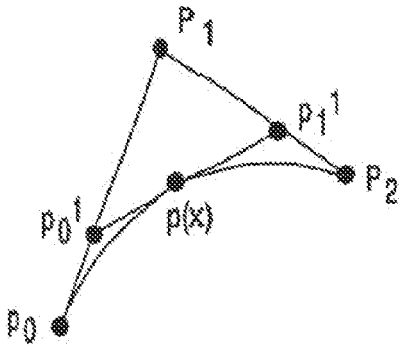
FIG. 8 shows an embodiment of an interpolation approach to obtain soft clipping according to the invention.
Figure 10:
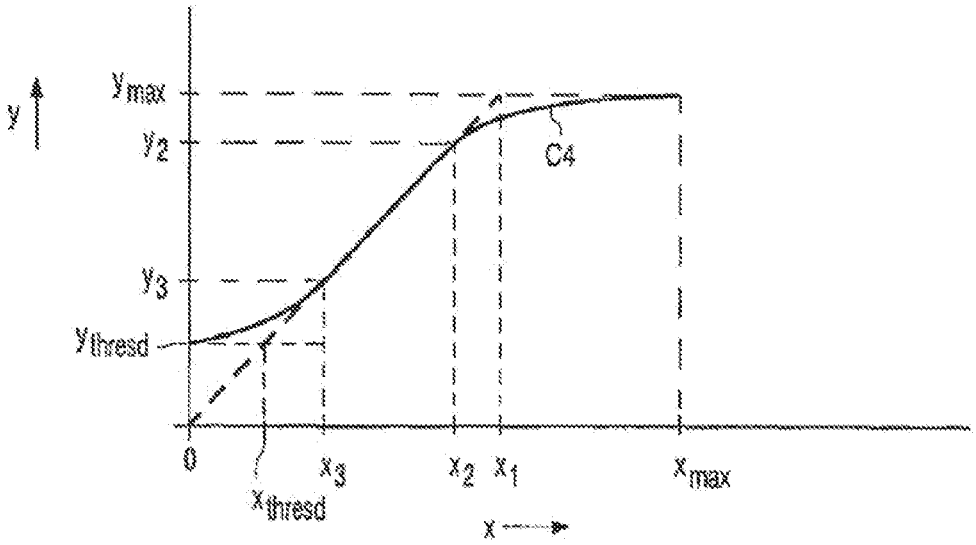
FIG. 10 shows a graph of the output gray levels of the output signal as function of the gray levels of the input signal.

The known method in the field of computer graphics of Bezier Curves may be applied as smoothing algorithm, in particular the quadratic form of the Bezier Curve. This quadratic form is simply a linear interpolation of the linear interpolation between three control points $P_0$, $P_1$, and $P_2$ as shown in FIG. 8. The algorithm given below is iterated, indicated by the integers h and t, for a number of samples m on the smooth Bezier curve of the output signal V2. The output gray levels y of the output signal V2 as function of the gray levels x of the input signal V1 are shown in FIG. 10. Basically, the curve C4 corresponds to the curve C4 shown in FIG. 4, however now the relation with the output signal is shown instead of the relation with the light output L. The output gray levels y have been given the same indices as the corresponding gray levels x. The algorithm is:

$t=0$,
For h=1 to m {
$P_0^1=(1-t)P_0+tP_1$,
$P_1^1=(1-t)P_1+tP_2$,
$P(t)=(1-t)P_0^1+tP_1^1$,
$t=t+(1.0/m)$}

Soft clipping on the while levels is implemented using $P_0=y_2$ (chosen arbitrarily but must be smaller than $y_{max}$ and greater than zero; see also FIG. 10), $P_1=y_{max}$ and $P_2=y_{max}$. The number of samples m may be selected to be equal to the number of gray levels between $x_{max}$ and $x_2$.

For soft clipping on the dark gray levels, $P_0=y_{thresd}$, $P_1=y_{thresd}$ and $P_2=y_3$. The value $y_3$ may be $2*y_{thresd}$, resulting in a number of samples m equal to $x_3$.

Figure 5:
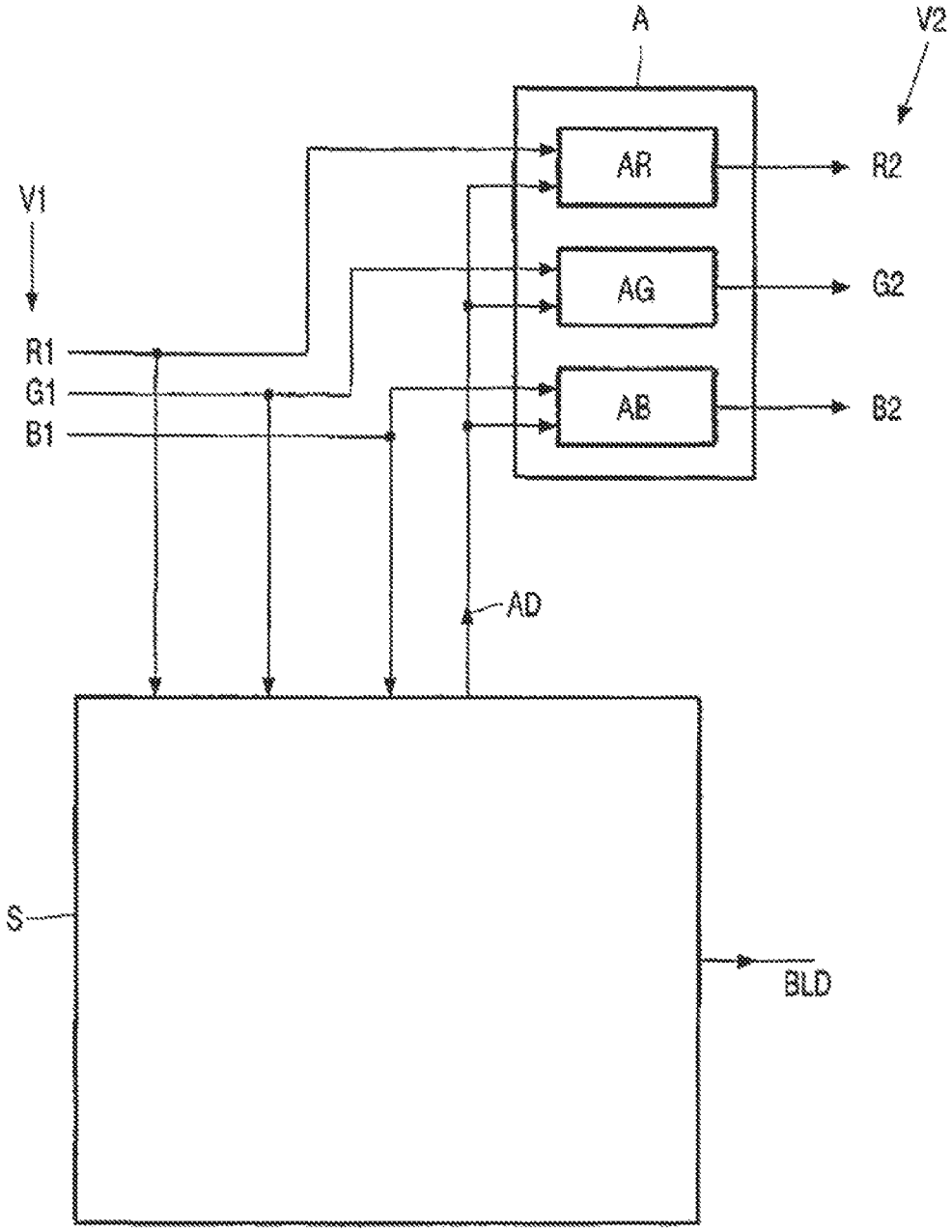
FIG. 5 shows a block diagram of an embodiment of processing circuitry applied in the display device according to the invention.

If the input signal V1 comprises color components, for example a red component R1, a green component G1 and a blue component BR, the processing circuitry P may be realized as shown in the block diagram of FIG. 5. The selection circuitry S is adapted to select the dimmed brightness level Lbdim for which the sum of the error functions of each of the color component R1, G1, B1 is minimized. The gray levels of the color components R1, G1, B1 are to be interpreted as the amplitude levels of the color components R1, G1, B1. The sum may be determined based on a weighted addition of the error functions. The weighting may be based on the brightness contribution of each of the color components R1, G1, B1.

The selection circuitry S provides the light source drive signal BLD, which adjusts the light source BL to the selected dimmed brightness level Lbdim. The selection circuitry also provides the adaptation drive signal AD. Based on this adaptation drive signal AD the adaptation circuitry A adapts the gray levels (amplitudes) of each of the color components in respective color component adjustment circuits AR, AG, AB. Due to the dimming the colors in dark gray areas of the image are reproduced more correctly as the amplitudes corresponding to these dark gray levels of each of the color components are discernable in the displayed image. As mentioned before, further transformations may take place in the adaptation circuitry A. In case the display panel DP has primary colors differing from the primary colors of the input signal V1 and/or a different number of primary colors, then also the transformation from the primary colors of the input signal V1 to the primary colors of the display panel DP may be included.

Figure 6:
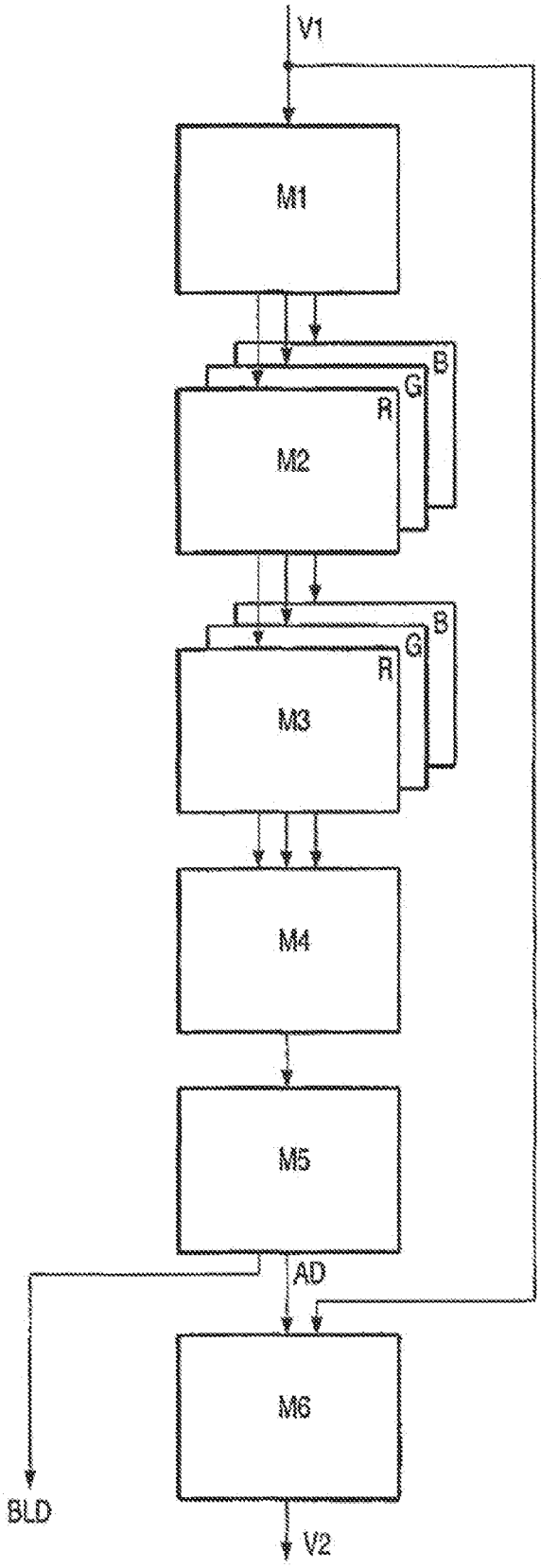
FIG. 6 shows a flow diagram of an embodiment according to the invention.

A further embodiment is illustrated with the flow diagram shown in FIG. 6:

In a first step M1 the input signal V1, representing an image to be displayed, is analyzed to detect regions of the image which should be excluded from further analysis. In case of a sequence of images, for example representing video images, the flow chart is repeated for each subsequent image of the sequence of images. Regions to be excluded may be black bars appearing at the top and bottom of the screen, black bars at the left and right side, subtitling, on-screen displays and/or any other information inserted in a video image. Detection of, for example, black bars is well known and is not elaborated further.

In a second step M2 a histogram is determined for each of the color components R1, G1, B1 of the input signal V1. Each histogram provides the number of occurrences of the gray levels (amplitudes) of the corresponding color component R1, G1, B1. The histograms may comprise data for all the regions or only for the regions which are not excluded in the first step M1.

In a third step M3 the error function is determined for each of the color components R1, G1, B1 for a given dimmed brightness level Lbdim.

In a fourth step M4 the error functions of the color components R1, G1, B1 are added. If the value of the error function is not the minimum value, the third step M3 and the fourth step M4 may be repeated for different values of the dimmed brightness level Lbdim until the value of the dimmed brightness level Lbdim has been found which corresponds to the minimum value of the error function for that image. Optionally, in order to save power, for example when a power save mode is selected by a user of the display module, dimming may also be applied to images which would not be dimmed according to the above-described flow diagram. In this case, the amount of dimming may be made dependent on the value of the resulting error function.

In a fifth optional step M5 smoothing is applied to avoid flickering of the displayed image by abrupt changes of the dimmed brightness level Lbdim for subsequent images. The smoothing may be obtained by making the value of the dimmed brightness level Lbdim dependent on a smoothed dimmed brightness level Lbdim applied to a previous image. For example, the smoothed dimmed brightness level LbdimS(n) for an n-th image in a sequence of images is given by:

$$LbdimS(n)=q\cdot Lbdim(n)+(1-q)\cdot LbdimS(n-1), \text{ with q a constant: } 0<=q<=1.$$

As result of the fifth step M5 the value of the selected smoothed dimmed brightness level LbdimS(n) for the $n^{th}$ image is available. This value is translated into a light source drive signal BLD which generates this brightness level when applied to the light source BL. Moreover, in the fifth step M5 the adaptation drive signal AD is generated, which, for example, comprises information about the gray level $x_1$ corresponding to the selected smoothed dimmed brightness level Lbdim.

Finally in a sixth step M6 the gray level $x_1$ corresponding to the selected smoothed dimmed brightness level Lbdim is used to determine according to which curve the gray levels of the input signal V1 should be adapted, for example according to the third curve C3 as shown in FIG. 3. Optionally soft clipping may be applied by as explained hereinbefore by applying the fourth curve C4 as shown in FIG. 4.

The smoothing as described in the fifth step M5 may be set to respond faster to an increase of the dimmed brightness level Lbdim(n) during subsequent images. This may be achieved by selecting a different constant q during the increase. The advantage is, that clipping in white areas is reduced for images with white areas following a sequence of dark images. At the same time the relatively slow response during a decrease of the dimmed brightness level Lbdim(n) for subsequent images, ensures that flickering of the displayed image is avoided. A suitable value for the constant q is 0.95 during a sequence of increasing dimmed brightness levels Lbdim(n) and q=0.05 during other sequences.

The smoothing may also take into account lamp parameters, for example at what rate a lamp is able to change its light output, or any limitations required to ensure an adequate lifetime of a lamp. The smoothing may also take into account actual operating conditions or historical operating conditions of a lamp.

Figure 9:
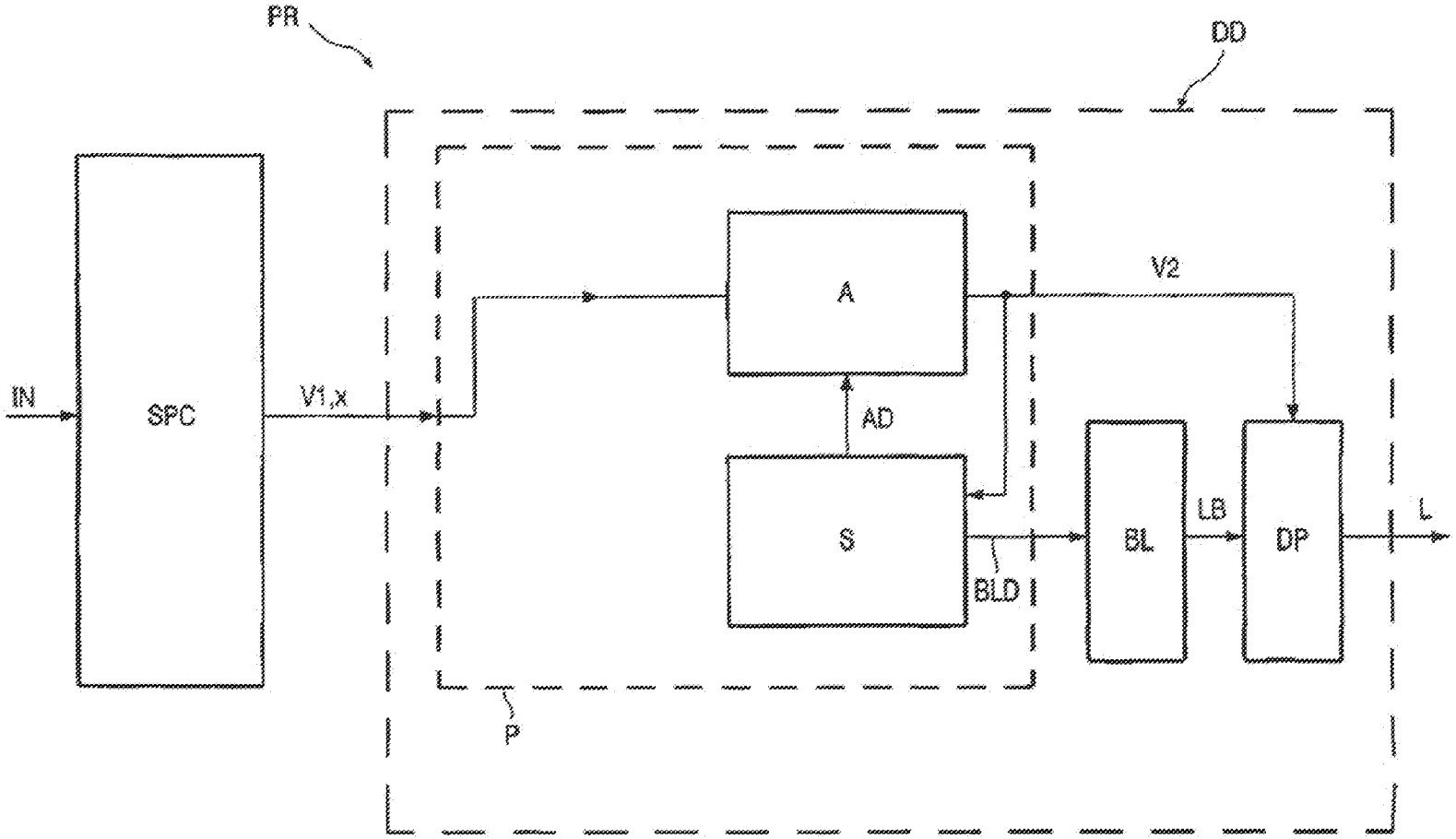
FIG. 9 shows a block diagram of an embodiment of the display device according to the invention with feedback.

FIG. 9 shows a block diagram of an embodiment of the display device according to the invention, which uses feedback. The diagram is the same as the one shown in FIG. 1, except that the input for the selection circuitry S is now the output signal V2. This means a feedback loop is present, wherein the selection circuitry S determines a dimmed brightness level Lbdim(n) for an $n^{th}$ image of a sequence of images and a corresponding adaptation drive signal AD on the basis of gray levels of the output signal V2 corresponding to the $(n-1)^{th}$ image.

When dimming the light source BL and simultaneously compensating for the dimming by adapting the input signal V1, the display panel operates at a higher transmission (or reflection) rate. Especially for LCD panels, at this higher transmission rate the viewing angle increases. This means that dimming in combination with adapting the input signal V1 as described hereinbefore has the additional advantage of improving the viewing angle for the dimmed images. Moreover a lamp of the light source requires less power when dimmed, so power is saved when dimming is applied. At the same time the lifetime of the lamp may be extended.

A further advantage is, that when the amount of dimming takes into account the operating limits of the light source, it is possible to select firstly the amount of dimming which the light source is able to follow, and then to determine the corresponding adaptation of the input signal V1. So, any mismatch, caused by the fact that the light source is not able to follow the requested brightness changes of subsequent images, is avoided, thereby avoiding picture quality deterioration.

It should be noted that the above-mentioned embodiments illustrate rather than limit the invention, and that those skilled in the art will be able to design many alternative embodiments without departing from the scope of the appended claims. For example, the allocation of the features in the various blocks of software or hardware may be changed without departing from the scope of the appended, claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of adjusting a light source of a display device, the display device comprising a display panel having display pixels for modulating light originating from the light source; and processing circuitry coupled to the display panel and the light source, the processing circuitry having an input for receiving an input signal representing gray levels of pixels of an image to be displayed on the display panel, the method comprising:

selecting a dimmed brightness level of the light source in dependence on the gray levels of the image pixels, the selecting step comprising:

selecting the dimmed brightness level from a plurality of temporary dimmed brightness levels, said selecting in dependence on: (i) a number of occurrences of a gray level corresponding to a brightness level of display pixels above the temporary dimmed brightness levels, and/or (ii) a number of occurrences of a gray level corresponding to a brightness level of display pixels below a predetermined brightness level being a fixed or adjustable level determined in dependence on the temporary dimmed brightness levels, and adapting the input signal in dependence on the dimmed brightness level.

2. The method as claimed in claim 1, the selecting step further comprising substantially minimize an error function including one or more weighted numbers of occurrences formed by multiplying each of the one or more numbers of occurrences by a weighting factor.

3. Processing circuitry having:

an input for receiving an input signal representing gray levels of pixels of an image to be displayed on a display panel of a display device, the display device comprising an adjustable light source, the display panel having display pixels for modulating light originating from the light source;

outputs for coupling to the display panel and the light source;

means for selecting a dimmed brightness level of the light source in dependence on the gray levels of the image pixels, the means for selecting being capable of:

selecting the dimmed brightness level from a plurality of temporary dimmed brightness levels, said selecting in dependence on: (i) a number of occurrences of a gray level corresponding to a brightness level of display pixels above the temporary dimmed brightness levels, and (ii) a number of occurrences of a gray level corresponding to a brightness level of display pixels below a predetermined brightness level being a fixed or adjustable level determined in dependence on the temporary dimmed brightness levels[.]; and means for adapting the input signal in dependence on the dimmed brightness level.

4. A display device comprising the adjustable light source; the display panel with display pixels for modulating light originating from the light source; and the processing circuitry as claimed in claim 3.

5. [A] *The* display device as claimed in claim 4, the predetermined brightness level being formed by the maximum contrast ratio of the display panel and each of the dimmed brightness levels.

6. [A] *The* display device as claimed in claim 4, the processing circuitry further comprising means for determining a smoothed dimmed brightness level (Lbdim S(n)) for an image in dependence on the selected dimmed brightness level (Lbdim (n)) of the image and a previous smoothed dimmed brightness level (LbdimS(n−1)) of a previous image, wherein n is a sequence number of successive images.

7. [A] *The* display device as claimed in claim 6, the smoothing having a faster response time to an increasing dimmed brightness level of subsequent images than to a decreasing dimmed brightness level of subsequent images.

8. [A] *The* display device as claimed in claim 4, wherein the means for selecting a dimmed brightness level are further adapted to select the dimmed brightness level in dependence on a content of a part of the image.

9. A product comprising the display device as claimed in claim 4, and signal processing circuitry for providing the input signal.

10. The display device as claimed in claim 4, the means for selecting being adapted to substantially minimize an error function including one or more weighted numbers of occurrences formed by multiplying each of the one or more numbers of occurrences by a weighting factor.

11. [A] *The* display device as claimed in claim 10, the error function being formed by an addition of the one or more weighted numbers of occurrences.

12. [A] *The* display device as claimed in claim 11, the error function being substantially:

$$E_{Tot}(x_1) = \sum_{x=0}^{x_{thread}} g(x)p(x) + \sum_{x=x_1+1}^{x_{max}} f(x)p(x),$$

wherein x is a variable representing the gray level of a pixel, g(x) and f(x) are weighting functions, p(x) is the number of occurrences of a pixel with the gray level x divided by the total number of pixels in the image, $x_1$ is the gray level providing the dimmed brightness level, $x_{max}$ is a maximum available gray level in the input signal, $x_{thresd}$ is the gray level corresponding to the predetermined brightness level.

13. [A] *The* display device as claimed in claim 12, the weighting functions (f(x), g(x)) being substantially equal to one.

14. [A] *The* display device as claimed in claim [5] *12*, at least one of the weighting functions (f(x), g(x)) being formed by a sum ($f_{ij}$) of deviations (d(k1,k2)) of gray levels between a pixel and its neighboring pixels, with k1, k2 being indices identifying the neighboring pixels.

15. [A] *The* display device as claimed in claim 14, the pixel being the pixel having the highest sum ($f_{ij}$) of all pixels with this gray level in an image.

16. [A] *The* display device as claimed in claim [5] *12*, at least one of the weighting functions (f(x), g(x)) being formed by a deviation of the gray level from a gray level corresponding to each of the temporary dimmed brightness levels or by a deviation from a gray level corresponding to the predetermined brightness level.

17. [A] *The* display device as claimed in claim 10, the input signal comprising color components (R1, G1, M1) of the image, a component error function being determined for each of the color components (R1, G1, B1), the error function being formed by adding the component error functions.

18. Processing circuitry having:

an input for receiving an input signal representing gray levels of pixels of an image to be displayed on a display panel of a display device, the display device comprising an adjustable light source, the display panel having display pixels for modulating light originating from the light source;

outputs for coupling to the display panel and the light source;

means for selecting a dimmed brightness level of the light source in dependence on the gray levels of the image pixels, the means for selecting being capable of:

selecting the dimmed brightness level from a plurality of temporary dimmed brightness levels, said selecting in dependence on: (i) a number of occurrences of a gray level corresponding to a brightness level of display pixels above the temporary dimmed brightness levels, and (ii) a number of occurrences of a gray level corresponding to a brightness level of display pixels below a predetermined brightness level being a fixed or adjustable level determined in dependence on the temporary dimmed brightness levels, and means for adapting the input signal in dependence on the dimmed brightness level;

wherein the means for selecting being adapted to substantially minimize an error function including one or more weighted numbers of occurrences formed by multiplying each of the one or more numbers of occurrences by a weighting factor; and, wherein, the error function being substantially:

$$E_{Tot}(x_1) = \sum_{x=0}^{x_{thread}} g(x)p(x) + \sum_{x=x_1+1}^{x_{max}} f(x)p(x),$$

where x is a variable representing the gray level of a pixel, g(x) and f(x) are weighting functions, p(x) is the number of occurrences of a pixel with the gray level x divided by the total number of pixels in the image, $x_1$ is the gray level providing the dimmed brightness level, $x_{max}$ is a maximum available gray level in the input signal, $x_{thresd}$ is the gray level corresponding to the predetermined brightness level.

*19. Processing circuitry comprising:*

*an input to receive an input signal representing gray levels of pixels of an image to be displayed on a display panel of a display device, the display device comprising an adjustable light source, the display panel having display pixels for modulating light originating from the light source;*

*outputs to couple to the display panel and the light source;*

*a processor configured to select a dimmed brightness level of the light source in dependence on the gray levels of the image pixels, the processor further configured to:*

*select the dimmed brightness level from a temporary dimmed brightness level, said selecting in dependence on*

*at least one of: (i) a number of occurrences of a gray level corresponding to a brightness level of display pixels above the temporary dimmed brightness level, or (ii) a number of occurrences of a gray level corresponding to a brightness level of display pixels below a predetermined brightness level being a fixed or adjustable level determined in dependence on the temporary dimmed brightness level, and*

*adapt the input signal in dependence on the dimmed brightness level.*

*20. The processing circuitry as claimed in claim 19, the processor further configured to substantially minimize an error function including one or more weighted numbers of occurrences formed by multiplying each of the one or more numbers of occurrences by a weighting factor.*

*21. The processing circuitry as claimed in claim 20, the error function being formed by an addition of the one or more weighted numbers of occurrences.*

*22. The processing circuitry as claimed in claim 21, the error function being substantially:*

$$E_{Tot}(x_1) = \sum_{x=0}^{x_{thread}} g(x)p(x) + \sum_{x=x_1+1}^{x_{max}} f(x)p(x),$$

*wherein x is a variable representing the gray level of a pixel, g(x) and f(x) are weighting functions, p(x) is the number of occurrences of a pixel with the gray level x divided by the total number of pixels in the image, $x_1$ is the gray level providing the dimmed brightness level, $x_{max}$ is a maximum available gray level in the input signal, $x_{thresd}$ is the gray level corresponding to the predetermined brightness level.*

*23. The processing circuitry claimed in claim 22, the weighting functions (f(x), g(x)) being substantially equal to one.*

*24. The processing circuitry as claimed in claim 22, at least one of the weighting functions (f(x), g(x)) being formed by a sum ($f_{ij}$) of deviations (d(k1,k2)) of gray levels between a pixel and its neighboring pixels, with k1, k2 being indices identifying the neighboring pixels.*

*25. The processing circuitry as claimed in claim 24, the pixel being the pixel having the highest sum ($f_{ij}$) of all pixels with this gray level in an image.*

*26. The processing circuitry as claimed in claim 22, at least one of the weighting functions (f(x), g(x)) being formed by a deviation of the gray level from a gray level corresponding to only one of the temporary dimmed brightness level or by a deviation from a gray level corresponding to the predetermined brightness level.*

*27. A display device comprising an adjustable light source; a display panel with display pixels for modulating light originating from the light source; and the processing circuitry as claimed in claim 19.*

*28. The display device as claimed in claim 27, the predetermined brightness level being formed by the maximum contrast ratio of the display panel and the dimmed brightness level.*

*29. The display device as claimed in claim 27, the processor being configured to determine a smoothed dimmed brightness level (Lbdim S(n)) for an image in dependence on the selected dimmed brightness level (Lbdim (n)) of the image and a previous smoothed dimmed brightness level (LbdimS (n−1)) of a previous image, wherein n is a sequence number of successive images.*

*30. The display device as claimed in claim 29, the smoothing having a faster response time to an increasing dimmed brightness level of subsequent images than to a decreasing dimmed brightness level of subsequent images.*

*31. The display device as claimed in claim 27, the processor being further configured to select the dimmed brightness level in dependence on a content of a part of the image.*

*32. The display device as claimed in claim 27, the processor being configured to substantially minimize an error function including one or more weighted numbers of occurrences formed by multiplying each of the one or more numbers of occurrences by a weighting factor.*

*33. A method of adjusting a light source of a display device, the display device comprising a display panel having display pixels for modulating light originating from the light source; and processing circuitry coupled to the display panel and the light source, the processing circuitry having an input for receiving an input signal representing gray levels of pixels of an image to be displayed on the display panel, the method comprising acts of:*

*selecting a dimmed brightness level of the light source in dependence on the gray levels of the image pixels, the selecting act comprising:*

*selecting the dimmed brightness level from a temporary dimmed brightness level, said selecting in dependence on*

*at least one of: (i) a number of occurrences of a gray level corresponding to brightness level of display pixels above the temporary dimmed brightness level, or (ii) a number of occurrences of a gray level corresponding to a brightness level of display pixels below a predetermined brightness level being a fixed or adjustable level determined in dependence on the temporary dimmed brightness level; and*

*adapting the input signal in dependence on the dimmed brightness level.*

*34. The method as claimed in claim 33, the selecting act further comprising substantially minimizing an error function including one or more weighted numbers of occurrences*

*formed by multiplying each of the one or more numbers of occurrences by a weighting factor.*

*35. The method as claimed in claim 34, comprising an act of forming the error function by an addition of the one or more weighted numbers of occurrences.*

*36. The method as claimed in claim 35, the error function being substantially:*

$$E_{Tot}(x_1) = \sum_{x=0}^{x_{thread}} g(x)p(x) + \sum_{x=x_1+1}^{x_{max}} f(x)p(x),$$

*wherein x is a variable representing the gray level of a pixel, g(x) and f(x) are weighting functions, p(x) is the number of occurrences of a pixel with the gray level x divided by the total number of pixels in the image,* $x_1$ *is the gray level providing the dimmed brightness level,* $x_{max}$ *is a maximum available gray level in the input signal,* $x_{thresd}$ *is the gray level corresponding to the predetermined brightness level.*

*37. The method as claimed in claim 36, the weighting functions (f(x), g(x)) being substantantially equal to one.*

*38. The method as claimed in claim 36, comprising an act of forming at least one of the weighting functions (f(x), g(x)) by a sum* ($f_{ij}$) *of deviations (d(k1,k2)) of gray levels between a pixel and its neighboring pixels, with k1, k2 being indices identifying the neighboring pixels.*

*39. The method as claimed in claim 38, the pixel being the pixel having the highest sum* ($f_{ij}$) *of all pixels with this gray level in an image.*

*40. The method as claimed in claim 36, comprising an act of forming at least one of the weighting functions (f(x), g(x)) by a deviation of the gray level from a gray level corresponding to only one of the temporary dimmed brightness level or by a deviation from a gray level corresponding to the predetermined brightness level.*

* * * * *